Feb. 6, 1962    F. B. PFEIFFER    3,020,190
METHOD OF MAKING A VEHICULAR TIRE
Filed Feb. 14, 1958    2 Sheets-Sheet 1

INVENTOR.
FRED B. PFEIFFER
BY
Jesse R. Crossan
ATTY.

Feb. 6, 1962   F. B. PFEIFFER   3,020,190
METHOD OF MAKING A VEHICULAR TIRE
Filed Feb. 14, 1958   2 Sheets-Sheet 2

INVENTOR.
FRED B. PFEIFFER
BY
Jesse R. Crossan
ATTY.

United States Patent Office 3,020,190
Patented Feb. 6, 1962

3,020,190
METHOD OF MAKING A VEHICULAR TIRE
Fred B. Pfeiffer, 270 Ferndale Ave., Akron 4, Ohio,
assignor of one-half to Jesse R. Crossan
Filed Feb. 14, 1958, Ser. No. 715,232
2 Claims. (Cl. 156—125)

This invention relates to tires and the method of making the same. While the invention is illustrated in connection with the construction and method of manufacturing a pneumatic rubber automobile tire, it is to be understood that it is not to be limited to such tires but that aeroplane tires and vehicular tires of any type are within the contemplation of the invention. It is also to be understood that the invention is not limited to rubber tires but that any material found suitable may be used, as for example, but without limitations a thermo-plastic that solidifies when its temperature is reduced from a higher temperature to approximately the maximum temperature a tire reaches in service.

Pneumatic automobile tires now in common use are complicated in construction, contain a relatively large volume of rubber, have relatively thick tread portions and depend to a large extent upon the adhesion between many cured separate parts of the tire for the tire's life in service. In this application the word "carcass" refers to the composite assembly of all parts of the tire except the tread. Thus in present tires the tread portion is attached to the carcass of the tire by superimposing a tread relative to a carcass and then vulcanizing the tread and carcass together. The carcass itself is composed ordinarily from four to sixteen or more plies depending on the size and requirements of the tire, these plies being composed of rubberized fabric and each ply being united to an adjacent ply by means of a vulcanization. In similar fashion other integral parts of the tire, as chafers, inserts, reinforcing strips, beads, cushions, breaker-strips, etc., are held in position with all other parts in a molded homogeneous mass that makes up the tire. Such tires require considerable labor and skill to fabricate and their component parts are subject to deterioration and variation in processing all of which detracts from the quality of the tire. In service such tires often develop separation between the tread and the carcass; between their plies; and in fact between any of the component parts of the tire. The many causes of these separations are too familiar to those skilled in the art to require enumerating, however, the generation of heat within the tire when the tire is run in service may be particularly pointed out. Such tires composed of parts as just enumerated necessarily have substantially thick carcasses of rubberized fabric. When a tire is run on the road heat is generated in the tire and rubber being a poor conductor of heat the generated heat does not readily reach the surface of the tire, which results in the temperature of the tire rising to a point sufficient to deteriorate the rubber which often results in separation of the tire components and thereafter the complete failure of the tire. Of course separation may result from inferior compounds, poor tire design, foreign material in or on the component parts of the tire, improper vulcanization, etc., all of which are serious faults of the pneumatic tires now in common use and it is such faults the present invention eliminates in many respects and substantially reduces in others.

Some of the objects of the present invention are to make possible a reduction of the required thickness of a tire and thereby reduce the heat generation of a tire in service; to reduce the number of separate parts required to fabricate a tire and thereby reduce the amount of labor required to manufacture the tire; to simplify the stock preparation work with its attendant opportunity for defective and variable stock; to produce a tire with a relatively higher salvage value than tires heretofore produced; to produce a tire which does not require an inner tube or separate means for retaining air or other pressure medium necessary for internal pressure within the tire when the tire is used in service; and to provide a method of molding tires that dispenses with the use of curing bags or tubes.

Referring to the drawings:

FIGURE 1 is a fragmentary perspective view partly in section of a tire built in accordance with the invention, the tire being shown on a curing bag in a tire curing mold but with one-half of the curing mold removed, and with a fragment of the tire over load-bearing members removed;

FIGURE 2 is a cross-sectional view of an assembly of the load-bearing members and the tire beads of the tire, in position over a curing bag, in a tire curing mold, with unvulcanized bead and sidewall compound interposed between the load-bearing members and a curing bag and with a preformed unvulcanized rubber strip associated with the beads of the tire and chafing strips applied to said strip, this assembly illustrating the relative position of these enumerated parts before the curing bag has been subjected to internal pressure;

Figure 1:
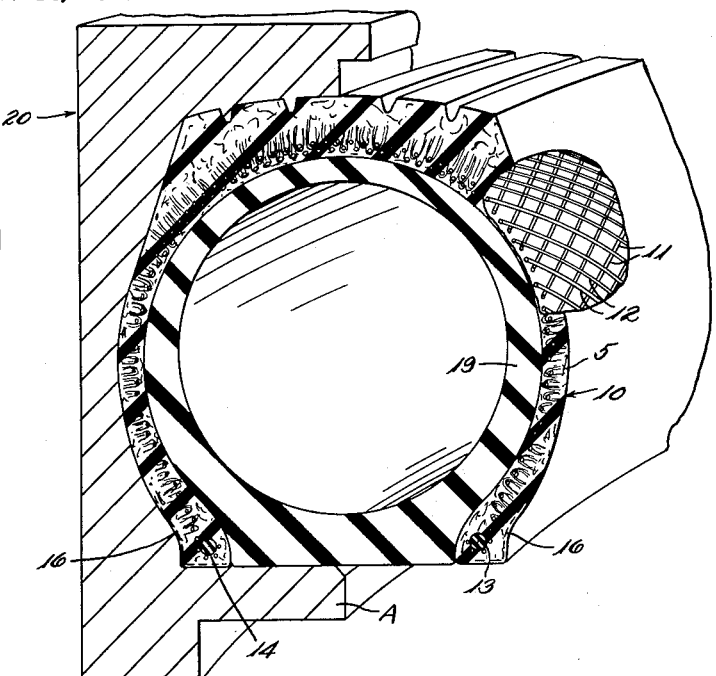

Referring more particularly to the drawings it will be seen that FIGURE 1 discloses a tire 10 having a toroidal like cage construction of load-bearing members 11 and 12 which extend transversely between two spaced tire bead grommets 13 and 14. These grommets may be wire cables or of any material found satisfactory. In this embodiment of the invention these load-bearing members are composed of any metal found satisfactory in strength and in undergoing the flexing to which they are subjected when the tire is used in service. It is preferred to use but the invention is not limited to a high carbon wire of approximately .040" in diameter, the wires in each layer being approximately ¼" apart on the tread of the tire. These wires forming the load-bearing members of the tire are preferably in two layers, the inside layer being composed of wires 11 and being brazed or, otherwise attached to metal bead grommets 13 and 14 and extending from the outside of said grommets. The outside layer is composed of wires 12 which are brazed or otherwise attached to the grommets 13 and 14 and extend from the lateral outside thereof. The wires in the inner layer and those in the outer layer extend from grommet to grommet of the tire in a direction that results in wires crossing at the tread of the tire at an angle of approximately 90°. The length of the wires in the inner and outer layers is such that the inner layer lies spaced apart from the outer layer a distance sufficient to permit a separating wall of rubber to flow between the two layers during molding of the tire. It is to be understood, however, that I do not restrict my invention to any number of layers of wires, or to the separation of the same, or to the angle on which they extend from one bead to the other. It will be obvious to those familiar with the art that as the beads of the tire are supported on wider or narrower tire rims in service that the tire's stability will be affected. Therefore, it is contemplated that various kinds of metal load-bearing members of any cross-sectional contour may be used, that they may be extended from bead to bead on any desired angle (including so-called zero angle, namely, 90° to the grommet) and in one or more layers, and that the load-bearing members may be attached to the beads in any practical manner found satisfactory. The invention further contemplates that the load-bearing members may be crimped to add to the elasticity of such members and in the event that the load-bearing members cross each other in contact or approximately so that the said crimps will serve to interlock the load-bearing members preventing chafing of one against the other. Also that these load-bearing members when used in more than one layer may all extend from one or both sides of the grommets, or if found desirable each of the grommets 13 and 14 may be formed in two or more parts adapted to receive the load-bearing members between them. It is also within the conception of this invention that the layers of the load-bearing members may be laid directly in contact with each other, if it is found desirable to do so. While the grommets 13 and 14 are illustrated as being round in cross-sectional shape they may be triangular or any other shape found more desirable, as for example the grommets 13 and 14 may have holes in them adapted to receive the ends of the load-bearing members 11 and 12. Strips of preformed unvulcanized rubber 15, 15a are placed about the grommets 13 and 14 to give the tire beads shape and rubber coverage of the grommets. Fabric chafing strips 16 are used and of course additional strips and parts may be added if desired, for example, flexing control inserts or one or more wire or fabric plies. The tire may be manufactured with a smooth or a non-skid tread as desired.

Figure 3:
FIGURE 3 is a cross-sectional view of an unvulcanized strip of tread and sidewall compound preformed by an extruding machine and showing the distribution of fibres in banbury mixed compound.
Figure 2:
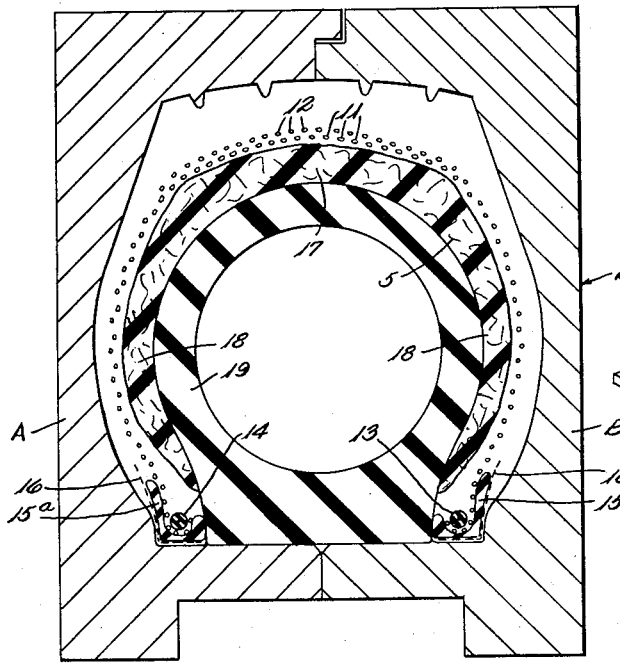

In manufacture of said tire the rubber compound composing the tread and sidewalls of the tire contains a relatively high percent of fibres 5 of substantial length mixed thoroughly with the other ingredients of the said compound. One satisfactory way of mixing the compound is to mix all the ingredients of the compound in the usual method commonly used to mix tread stock in a banbury mixer, the said fibers being added at a time during the mixing which will give the fibers 5 the most uniform dispersion in the batch without breaking said fibers into too short lengths. In the present illustration cotton fibers are used but the invention is not limited to cotton fibers as obviously many kinds of fibers may be substituted and, indeed, strips cut from cloth or other material may be used in place of fibers. Also the mixing of the fiber or other material into the batch may be done on a mixing mill or into a rubber solution, or other ways that will be obvious to those familiar with the art. In the present illustration rubber compound is extruded through dies of an extruding machine which forms integrally a tread portion 17 and sidewall portion 18 as shown in FIGURE 3. A suitable length of the tread and sidewall 17 and 18 respectively, is cut and spliced together to form a tread band in any usual or satisfactory manner. This tread band is of a length and width to cover the outside expandable surface of curing bag 19 on which it is placed as illustrated in FIGURE 2. However, as an alternative step in the method, the integrally formed tread and sidewall may, if desired, be placed over the inside surface of said cage formed of the load-bearing members 11 and 12 and the grommets 13 and 14 either by hand or by any other means found satisfactory. After the tread and sidewall have been put into position the gum strips 15 and the chafer strips 16 are placed in position. A curing bag 19 is next inserted into the tire assembly where it occupies the relative position shown in FIGURE 3. The composite assembly is now ready to be placed in a vulcanizing mold 20, having two parts A and B. The curing bag 19 is shown as a heavy rubber curing bag but obviously it could be very thin and flimsy. After the composite assembly has been placed in the mold 20 (which preferably is preheated) the compound of the tire is permitted to become heated from the heat of the mold or steam turned into the curing bag or both until the rubber becomes soft and readily flowable after which internal pressure is built up inside the curing bag 19 by turning into it, through a curing bag valve, not shown, air, water, hot water, steam, or any other pressure medium. The internal pressure causes the curing bag to expand which forces the compound forming the tread and sidewall outwardly past the anchored and relatively inextensible load-bearing members until the tread and sidewall compound contacts the molding surface of the mold 20 as shown in FIGURE 1, but with both halves of the mold in proper assembly, in which position the compound is permitted to remain under pressure until it is either wholly or partially vulcanized. Next the tire 1 (see FIGURE 1) is removed from the mold when, if only partially vulcanized, the vulcanization may be finished in an open heat. If vulcanization was completed in the mold then the tire is a finished product except for any extraneous treatment such as buffing, painting or the like. By reference to FIGURE 1 it will be seen that as the load-bearing members 11 and 12 embed themselves in the compound of the tread and sidewall by the flow of said compound about said load-bearing members that many of the fibers in the compound will lodge on said load-bearing members and be anchored thereto. Some of the fibers will be bent sharply about said members and others will be deflected only slightly thereabout while others will not be in contact with the said members. However, it will be obvious to those familiar with the art that the load-bearing members embedded in the said compound with fibers caught about said members with the fibers extending from their anchorage on the said members into the said compound of which they are a part will substantially resist any tendency the load-bearing members have to cut through or to be torn out of the compound when the tire is in service.

Figure 5:
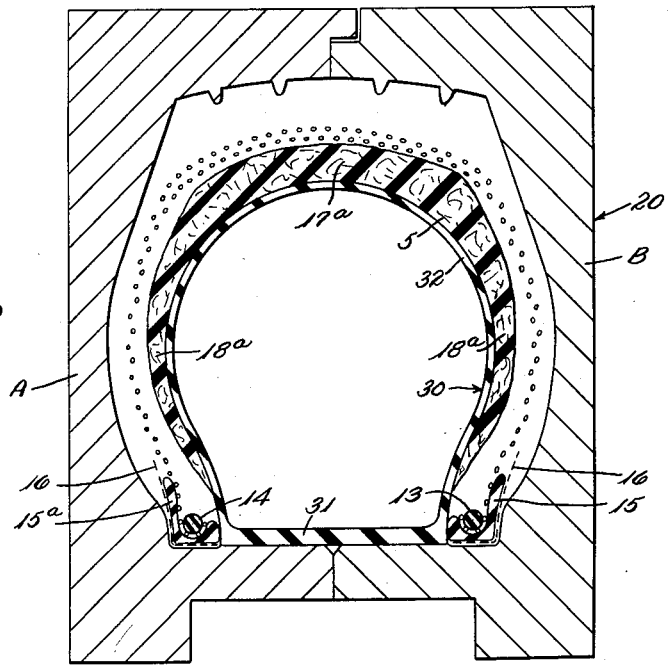
FIGURE 5 is similar to FIGURE 2 but illustrating a tire and tube constructed as one unit.

The tire shown in FIGURE 1 may be modified to include as an integral part of the tire a closed base portion by extending the portion 18 shown in FIGURE 3 to form a tube 30 as illustrated in FIGURE 5. The tube 30 is formed by an extruding operation in the same manner as inner tubes are now commonly extruded and are cut to a proper length and spliced to form an unvulcanized tube in like manner as automobile tire inner tubes. An inner tube valve is attached to or inserted in the tube and the tube is then placed in position as shown in FIGURE 5. The completion of the tire is done in the same manner as that described hereinabove in connection with FIGURES 1 and 2. In extruding the tube 30 a thickened tread portion 17a, a sidewall portion 18a, and a relatively thin base portion 31 is formed and as will be understood by those familiar with the art the portion 31 may be of different compound than that of the road contact portion 17a and the base stock may extend in a relatively thin layer 32 over the entire inner surface of the portions 17a and 18a. It is preferred that the compound of this inner layer 32 be of inner tube stock free of fibers so that if cotton fibers were used in the portions 17a and 18a that air which may be used for inflation of the tire will not contact said cotton fibers and leak through such fibers into the compound or to the atmosphere.

From the above discussion it will be evident to those familiar with the art that the load-bearing members could be woven in similar fashion as is braided hose woven with the compound on the inside of the tubular braided load-bearing members, and that a proper length of such assembly be spliced into an annular uncured single-tube bicycle tire form, when a tire valve may be inserted and composite assembly placed in a tire curing mold and vulcanized. Such adaptations of the invention are within its spirit.

At present it is common to build tires on flat, semi-flat or shoulder building drums, or on substantially tire shaped building cores. Obviously those skilled in the art will be able to adapt the invention to tires built on such drums as well as to devise other ways of utilizing the invention. The invention contemplates the building of the load-bearing members and beads into a flat or shoulder drum shape and then embedding the load-bearing members into the rubber compound either before or after the assembly is fashioned into a tire shape. Also that the load-bearing members may be built directly into the rubber compound with the rubber compound either of one compound or of different compounds arranged in layers or otherwise, as for example, one type of compound to be placed on the inside or below the load-bearing members and another type above them. It is also to be understood that the invention contemplates the weaving, automatically or otherwise, of the load-bearing members into a continuous length which may be incorporated into a tire to function in accordance with this invention. It is pointed out that since the art of building tires is practiced in many ways and that to attempt to illustrate the invention in connection with all of these possible ways would add objectionable length to this application.

Figure 4:
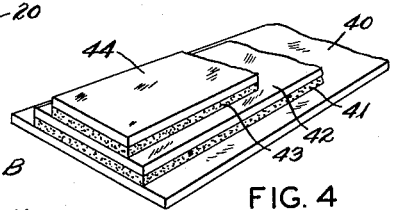
FIGURE 4 is a perspective view of a length of an assembly of strips of rubber compound and strips of fibrous material illustrating one method of incorporating fibers in the tread and sidewall portion of a tire.

There are many ways of incorporating fibers in the rubber stock, plastic material or rubber-like material which may be used and the invention is not to be limited to any particular method. FIGURE 4 discloses a length of unvulcanized tread stock known in the tire manufacturing art as a plied-up tread. In this illustration a base ply 40 has superimposed a strip of fibrous material 41 over which is a strip of rubber 42 and next to that a strip of fibrous material 43 and then a strip of rubber 44. Such arrangement of material as shown in FIGURE 4 may be varied in many ways and be substituted for the portions 17 and 18 of FIGURE 3. As indicated hereinbefore the fibrous material may be of any kind, may be woven, or of any other form or type that comes within the spirit of the invention.

Figure 6:
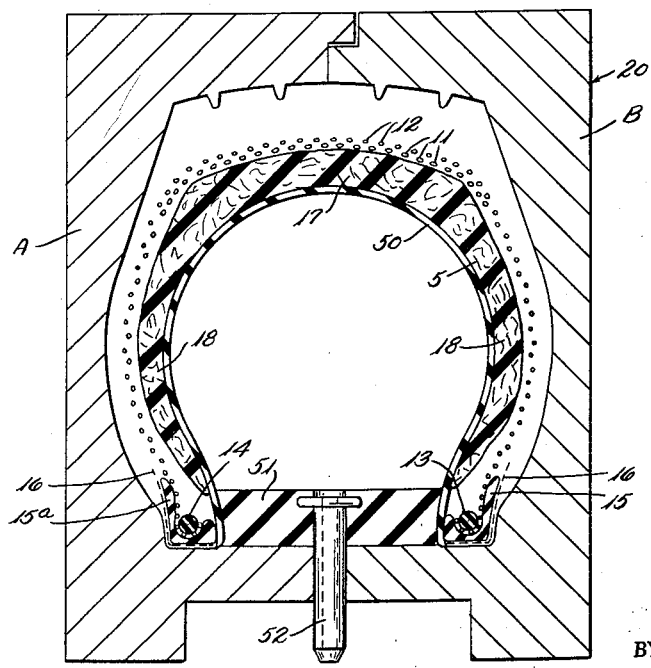
FIGURE 6 is similar to FIGURE 2 and illustrates components in their relative positions preparatory to molding an open-bellied tire with a fluid internal pressure medium in direct contact with the tire.

An important advantage of the present invention is illustrated in FIGURE 6 wherein the material 17a and 18a shown in FIGURE 5 is provided with a lining 50. This lining is composed of butyl or other suitable rubbery material that is impervious to air, water, steam or other gases that may be used to provide internal pressure for the tire 10 during its molding and when it is in service. A flexible bull ring 51 is disposed between the tire beads during the molding of the tire as illustrated in FIGURE 6. The bull ring functions to seal a fluid internal pressure medium such as water or steam within the tires during its vulcanization such medium being lead into the tire through a valve stem 52. This bull-ring method of molding and vulcanizing tires is well known in the art and therefore a detailed description of same is not necessary for a complete disclosure of the present invention. It is pointed out, however, that the novel construction of tire 10 makes possible the vulcanizing of tires without a curing bag, namely, with air, water, steam or the like in direct contact with the inside of the tire without danger of such pressure medium permeating the body of the tire. This is particularly true if the fibers 5 are omitted or the fibers are each composed of, for example, a single monofilament of nylon. Tubeless tires now in common use are subject to premature deterioration due to inflationary air permeating the tire lining and entering the tire body. A tire constructed as explained, herein above, solves the problem of air entering the tire body and such tire is a valuable contribution to the art of providing tubeless tires.

It will be obvious to those familiar with the art that in addition to mounting rubber 17 and 18, shown in FIGURE 3, rubber may be mounted on the outer surface of the cage. If rubber, or the like, is placed on the outer surface of the cage it will be understood that the material forced through the cage will contact the outer material and the materials are such that a union is formed between them when the tire is vulcanized.

It will now be seen and it is definitely pointed out that the present invention is useful with tire compounds from which fibers are omitted. For example, the tread portion 17 of FIGURE 3 may be tread compound, the sidewall portion 18 another compound and an under layer may be added composed of nylon, cotton or any material found suitable for union with the tread and sidewall 17 and 18 and will resist being forced, by tire inflationary pressure, past the strain members such as 11 and 12 when a tire is run in service. The present invention contemplates the forming of a strip of tire compound or compounds to predetermined shape, placing the strip in said cage as explained, laying the assembly in a tire mold of proper size relative to the assembled tire, subjecting the tire compound to expanding pressure to force the compound against and around the strain members forming the cage and against the molding surface of the mold, and retaining it there during vulcanization of the tire.

The detailed description of the particular embodiments of the invention illustrated and described herein is not to be construed as limiting the invention thereto. The invention includes all features of patentable novelty residing in the foregoing description and the accompanying drawings.

I claim:

1. In making a pneumatic tire a method which comprises the steps of attaching elongated inextensible load-bearing members to spaced tire bead grommets to form a cage of the general shape of an openbeaded tire; associating numerous fibers of substantial length with thermosetting material, applying said material with the fibers associated therewith over the inside surface of the crown portion of said cage; laying the cage, material and fiber assembled as described, in a tire mold preparatory to molding said tire, and then causing numerous said fibers to catch upon and fold about said load-bearing members by forcing said material with the fibers associated therewith against and beyond the load-bearing members a distance sufficient to entirely embed said members in the material and to mold the latter against the inner surface of the mold, and then applying heat to the thermosetting material and thereby causing said material to set while under said pressure.

2. The method of building a pneumatic tire comprising the steps of anchoring elongated inextensible tire load-bearing members to spaced tire bead grommets in fashion to form an open-bellied tire-shape cage; associating numerous fibers of substantial length with unvulcanized rubber; preshaping the rubber with the fibers associated therewith; disposing the preshaped rubber so distributed as to confront substantially the entire inner surface of the cage; providing a tire mold having a tire molding surface of greater area than the area of the outer surface of said cage; laying said cage, with the preshaped rubber therein, in said mold preparatory to molding the rubber to tire shape; folding numerous said fibers about said load-bearing members by pressing the outer surface of said preshaped rubber between the load-bearing members and against the mold thereby embedding the load-bearing members entirely within said rubber by subjecting said preshaped rubber to outwardly exerting fluid pressure and then vulcanizing said rubber while it is under said pressure.

References Cited in the file of this patent
UNITED STATES PATENTS

| | | |
|---|---|---|
| 420,610 | Southard | Feb. 4, 1890 |
| 518,849 | Moomy | Apr. 24, 1894 |

(Other references on following page)

UNITED STATES PATENTS

| | | |
|---|---|---|
| 708,954 | Blodgett | Sept. 9, 1902 |
| 1,380,085 | Walton | May 31, 1921 |
| 1,582,255 | Fairchild | Apr. 27, 1926 |
| 1,616,069 | Tuttle et al. | Feb. 1, 1927 |
| 2,452,752 | Hartranft | Nov. 2, 1948 |
| 2,650,633 | Eger | Sept. 1, 1953 |
| 2,675,047 | Andy | Apr. 13, 1954 |
| 2,757,701 | Henson | Aug. 7, 1956 |
| 2,925,623 | Beckadolph | Feb. 23, 1960 |